J. G. GRACEY.
DRIVING GEAR FOR VEHICLES.
APPLICATION FILED NOV. 19, 1917.
1,297,148.
Patented Mar. 11, 1919.
2 SHEETS—SHEET 1.
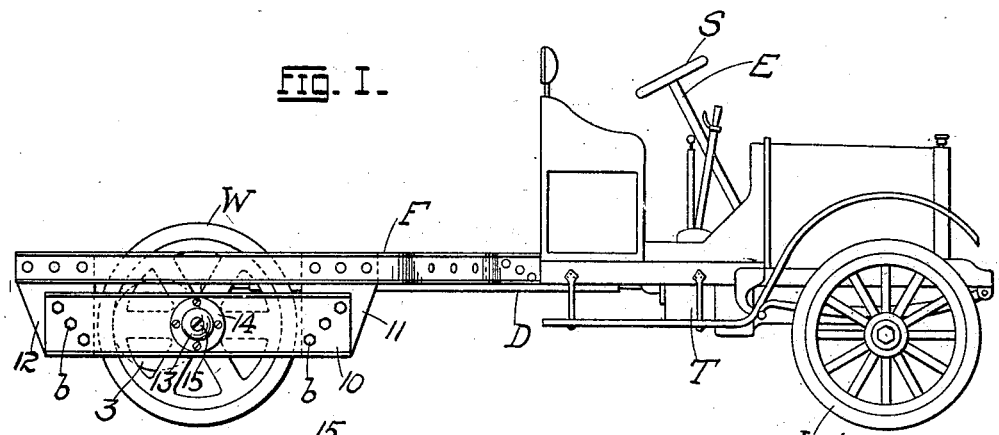
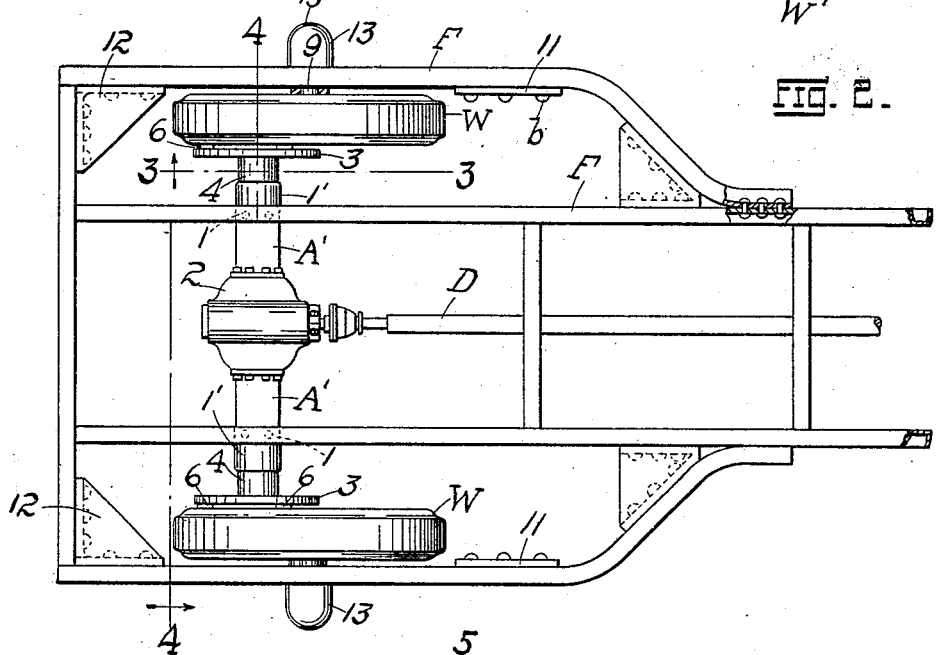
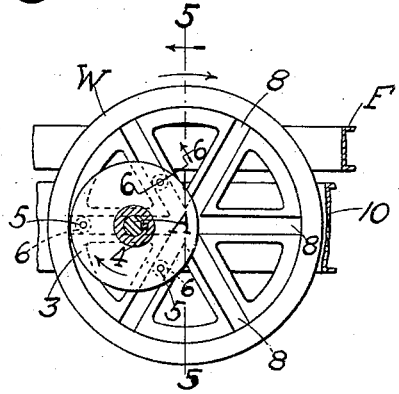
WITNESSES:
Harry A. Beines
Elsa M. Siegel
INVENTOR.
James G. Gracey
BY Emil Starek
ATTORNEY.

J. G. GRACEY.
DRIVING GEAR FOR VEHICLES.
APPLICATION FILED NOV. 19, 1917.
1,297,148.
Patented Mar. 11, 1919.
2 SHEETS—SHEET 2.
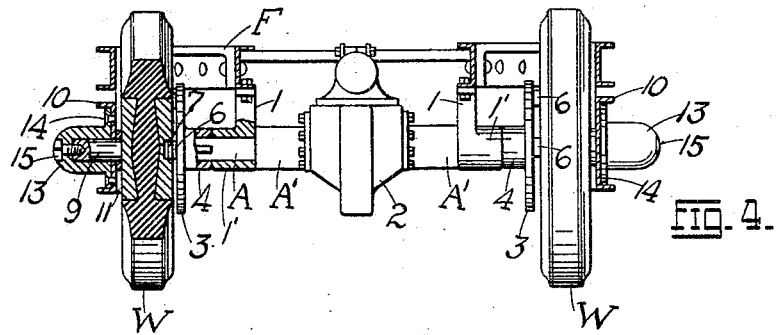
FIG. 4.
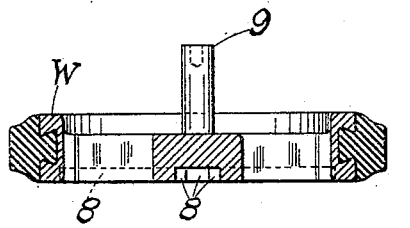
FIG. 5.
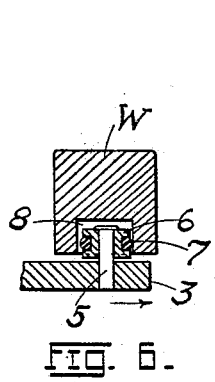
FIG. 6.
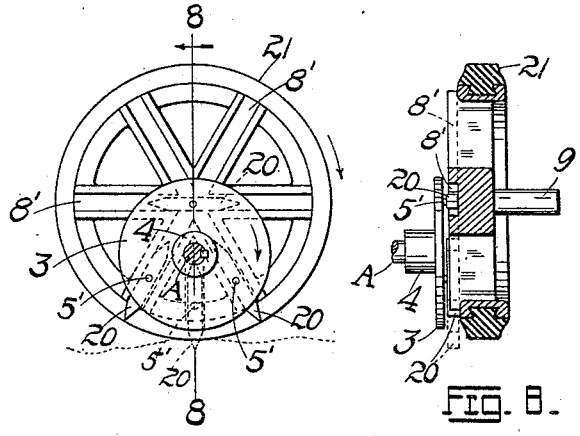
FIG. 7.
FIG. 8.
WITNESSES:
Harry A. Bennes
Elis M. Sirgel
INVENTOR.
James G. Gracey.
By Emil Starek
ATTORNEY.

UNITED STATES PATENT OFFICE.

JAMES G. GRACEY, OF ST. LOUIS, MISSOURI, ASSIGNOR OF ONE-HALF TO EMIL C. GANAHL, OF ST. LOUIS, MISSOURI.

DRIVING-GEAR FOR VEHICLES.

1,297,148.  Specification of Letters Patent.  Patented Mar. 11, 1919.

Application filed November 19, 1917. Serial No. 202,786.

*To all whom it may concern:*

Be it known that I, JAMES G. GRACEY, a citizen of the United States, residing at St. Louis, State of Missouri, have invented certain new and useful Improvements in Driving-Gears for Vehicles, of which the following is a full, clear, and exact description, reference being had to the accompanying drawings, forming a part hereof.

The present invention is directed to improvements in driving gear for vehicles, such as street cars, self-propelled vehicles, railway cars, motor trucks, and in fact any wheeled vehicle whatsoever, the invention being particularly of value in the case of self-propelled vehicles of whatever description. The object sought is to transfer the power of the motor-shaft to the running gear of the vehicle without the complication of gear wheels, worm wheels, sprocket wheels, sprocket chains and like instrumentalities, but on the contrary make the connection between the said shaft and running gear in a direct and positive manner with a view not only of simplification but of an attendant increase or multiplication of power and speed over that attained by the use of the conventional devices above referred to. A further object is to provide a driving gear which shall be simple, noiseless, readily applied to any type of motor, one capable of direct attachment to the running wheels of the vehicle thereby eliminating intermediate gearing, and one possessing further and other advantages better apparent from the following detailed description of the invention in connection with the accompanying drawings, in which—

Figure 1 represents a side elevation of a motor-truck frame showing my invention applied thereto; Fig. 2 is a top plan of the rear half of the truck frame with my invention installed thereon; Fig. 3 is a vertical longitudinal section on the line 3—3 of Fig. 2; Fig. 4 is a vertical cross-section on the line 4—4 of Fig. 2; Fig. 5 is a middle transverse section of the rear vehicle-wheel on the line 5—5 of Fig. 3; Fig. 6 is an enlarged cross-sectional detail on the line 6—6 of Fig. 3; Fig. 7 is a view similar to Fig. 3 showing a modification of the invention; and Fig. 8 is a cross-section on the line 8—8 of Fig. 7.

Referring to the drawings, and for the present to Figs. 1 to 6 inclusive, F represents the frame of a motor-truck or other self-propelled vehicle, D, the propeller or drive-shaft leading from the transmission gear-case T, W, the rear wheels, W′ the front wheels, E, the steering staff, S, the steering wheel, A, the rear axle, A′ the rear axle housing, the several parts mentioned and others illustrated but not alluded to being shown conventionally and well understood in the art. In the present embodiment of my invention the rear axle does not carry the rear wheels, the improved driving gear as herein applied not permitting the usual disposition of such axle by reason of the fact that certain elements of the gear mechanism move or cut across the common axis of rotation of the rear wheels at points between the wheels. In the present instance the axis of rotation of the rear axle A is eccentric (and parallel) to the axis of rotation of the rear wheels W, the said axle being supported by the hangers 1, 1, depending from the frame F, and driven in the usual way from the differential gear case or housing 2 the gearing of which is driven by the propeller or drive shaft D in a manner well understood in the art, and for which no claim is made herein.

In the present embodiment of my invention the opposite ends of the rear axle A terminate in rotor-members or disks 3 (or their equivalents) each disk being provided with a hub 4 which is keyed to the axle, the free end of the hub bearing against the adjacent end of the hub 1′ of the hanger 1. Disposed on the outer face of each disk 3 and spaced equal angular distances apart, are a plurality (three in the present example) of studs 5 on which are mounted antifriction rollers 6, said rollers being provided with peripheral bands 7 of rubber or equivalent yielding material (Fig. 6) serving the purpose of a cushion or tire whereby said roller operates without noise and takes up any play or lost motion between it and the walls of the raceway traversed thereby and by the stud. Formed on the inner face of each wheel W are a plurality (three in the present example) of diametrically disposed raceways 8 intercommunicating with one another at the axis of the wheel, said raceways terminating at the rim of the wheel, and being substantially U-shaped in cross-section to accommodate the rollers 6 above referred to, the number of rollers corresponding to the number of raceways, a single raceway extending the full diameter of the wheel. As clearly obvious from the drawings, the tire-bands 7 will cause the rollers to travel back and forth noiselessly through the raceways, the bands being composed of rubber or equivalent elastic and yielding material.

In the present embodiment of my invention the rear wheels W are mounted so as to be readily detachable from the vehicle frame F. Each wheel is provided with a stub axle or spindle 9 which passes loosely through an opening of a detachable member or plate 10, the latter being bolted to brackets 11, 12, depending from the sides of the frame. The outer projecting portions of the spindles 9 are received by cup-bearings 13 secured to the plates 10 opposite the openings thereof through which the spindles are passed, the cups 13 being provided with flanges 14 by which they are bolted to the plates 10. The closed ends of the cup bearings 13 are provided with openings for loosely receiving suitable screw-bolts or screws 15 which screw into the outer ends of the spindles 9, this arrangement serving to prevent inward axial displacement of the spindles and hence preventing any lateral movement of the wheels W. It will be observed (Fig. 3) that the rotation axis of the axle A is disposed in the same horizontal plane with the common axis of rotation of the driven wheels W. This arrangement permits a lowering of the propeller shaft D and allows the strains of the driving torque to become more evenly and uniformly distributed through the frame of the vehicle.

The operation is obviously very simple, and is substantially as follows: Assuming rotation to be imparted to the disk 3 in the direction shown by the arrow in Fig. 3 (clockwise) it is obvious that the roller-studs 5, with their rollers bearing against the sides of the raceways 8, will impart a corresponding rotation to the wheel W. With the members 3 and W rotating as described it is obvious that each roller-stud will traverse its respective raceway diametrically first in one direction and then the other, that it to say the studs will reciprocate in their raceways. By the time a stud reaches the axis of the wheel or point of intersection of the several raceways, another stud will have reached a point in its raceway radially removed from said axis, so that while one stud is performing no work as it sweeps across the axis of the wheel, the other studs (or stud where only two raceways and two studs are employed) are sufficiently removed radially from said axis to bear against the sides of their respective raceways in the wheel W, thereby following up or continuing the work of propulsion. Three raceways 8 are a convenient number, I may however employ only two raceways, or I may employ more than three without departing from the nature or spirit of my invention. Since the power applied to the wheel W is at some distance from the rotation axis, the leverage thus applied to the wheel permits a comparatively slow peripheral rotation to be imparted to the shaft D, and to the axle A, said peripheral speed being of course multiplied in the wheel W. This gain in speed at the wheels is an advantage in the case of motor trucks where it is not desirable to run the propeller shaft at a high rate of speed.

The invention herein finds special application in the case of tractors and cultivators which must necessarily pass over soft ground. To insure a firm purchase or grip of the wheels on such ground I may resort to the modification shown in Figs. 7 and 8. In that case the studs 5' of the rotor disk 3 are provided with shoes or blades 20 through which the studs loosely pass; the blades operating freely in the open-ended raceways 8' of the wheel 21. By the time a stud reaches the outer terminal of a raceway it will have forced the tapered end of the blade out of the raceway or beyond the periphery of the wheel (see dotted position in Fig. 7) causing the projecting portion to embed itself in the soft earth and thereby insuring for the wheel a firm grip on the soil and preventing slipping of the wheel. As the wheel continues in its rotation the blade is retracted into the raceway, the several blades reciprocating in their respective raceways the same as the roller studs 5 in the form first described. Obviously, in the modification referred to, the axis of the rotor disk 3 must be below the axis of the wheel in order that the outer limit of traverse of the stud 5' carrying the blade may be reached at the same time that the terminal of the raceway in which the blade is confined is passing over the surface of the ground into which the blade is to be driven or projected. In other respects the structure of the modification referred to is the same as the form first described and corresponding parts are identified by the same reference letters and numerals.

The stub axles 9 of the driven wheels W may be oiled by removing the bearing cups 13; and the wheel W may at any time be removed bodily from the vehicle frame by simply loosening and withdrawing the bolts b which secure the plates 10, then detaching the plates. The removal of the plates 10 causes them to pass off the stub-axles 9 of the wheels, leaving the wheels free for purposes of repair, renewal of a tire or for any other purpose. Obviously, the details here shown may be considerably departed from without a departure from the nature or spirit of the invention.

Having described my invention what I claim is:

1. In a vehicle of the character described, a suitable frame, running wheels therefor disposed on opposite sides of the frame and rotatable about a common axis disposed transversely of the frame, an axle mounted rearward of and parallel and eccentrically to the axis of rotation of the wheels, the axis of the axle being disposed substantially in the same horizontal plane with the axis of the wheels, a longitudinally disposed propeller shaft for imparting rotation to the axle, a rotor member at each end of the axle, a series of formations on said member spaced angularly apart, and a corresponding series of diametrically disposed raceways formed on the inner faces of the running wheels and traversed by said formations upon the rotation of the rotor member, whereby rotation is imparted to the wheels.

2. In a vehicle of the character described, a suitable frame, running wheels therefor disposed on opposite sides of the frame and rotatable about a common axis, suitable members detachably secured to the vehicle frame, spindles for the wheels, suitable cup-bearings for receiving said spindles secured to the detachable members aforesaid, diametrically disposed raceways formed on the inner faces of the wheels, a propeller shaft disposed longitudinally of the vehicle frame, an axle disposed parallel to and rearward of, the rotation axis of the wheels and with its axis in the same horizontal plane with the rotation axis of the wheels, an axle housing, disks secured to the axle and interposed between the axle housing and the raceways of the running wheels, and rollers mounted on the disks and traversing the raceways whereby upon rotation of the axle and disks, rotation is imparted to the wheels.

3. In a tractor, a wheel provided with diametrically disposed open-ended raceways, means for imparting rotation to the wheel, and blades coupled to said means and traversing said raceways and adapted to be periodically projected outside the ends of the raceways beyond the periphery of the wheel for digging into the soil and securing a firm purchase for the wheel.

In testimony whereof I affix my signature, in presence of two witnesses.

JAMES G. GRACEY.

Witnesses:
EMIL STAREK,
ELSE M. SIEGEL.

Copies of this patent may be obtained for five cents each, by addressing the "Commissioner of Patents, Washington, D. C."